United States Patent Office 3,444,734
Patented May 20, 1969

3,444,734
DEEP WATER TIDE RECORDER
Edward C. Brainard II, Marion, Mass., assignor to Braincon Corporation, Marion, Mass., a corporation of Massachusetts
Filed Nov. 3, 1966, Ser. No. 591,813
Int. Cl. G01w 1/00
U.S. Cl. 73—170                                      8 Claims

ABSTRACT OF THE DISCLOSURE

An environmental pressure measuring and recording device which includes a means for producing a reference pressure and a differential pressure indicator which responds to the environmental and reference pressure.

---

This invention relates generally to pressure measuring and recording instruments and more particularly to a pressure measuring and recording instrument which is capable of accurately measuring and recording relatively small deviations in pressure from a given pressure. This invention is particularly suited to measure tidal fluctuations in oceanography although it is not limited to such applications.

It is well known in oceanography that for given atmospheric conditions the pressure generated at a given depth by a mass of water is directly proportional to the height of the water above the given depth. Accordingly, in measuring tidal fluctuations, it is a common practice to position one or more pressure sensing devices at a fixed depth below the surface and to measure the pressure of the water at that depth. To avoid false readings caused by a change in depth of the pressure sensing devices, these devices are usually positioned on the floor of the ocean or other water body whose tidal flunctuations are to be measured.

Although depth recording systems of this type are adequate in relatively shallow waters, serious problems are encountered when it is desired to record the tidal variations at relatively great depths.

Heretofore the same type of pressure sensing devices that were utilized for shallow depths were also utilized for deep water applications, the sole concession to the more stringent requirements of the deep water applications lying in the provision of pressure sensing devices with extended ranges. In conventional pressure sensing devices, the major sources of error are due to a change in the temperature sensitivity of the device and to a change in the zero position due to temperature variations. The error in the reading of the pressure sensing device caused by the temperature sensitivity may be stated in terms of a percentage of the pressure reading. The error in the reading caused by the zero shift, however, is proportional not to the reading but to the full scale range of the instrument. Thus, increasing the range of the instrument to enable it to operate at greater depths also increases the reading error caused by zero shift; if the range of the instrument is sufficiently extended (that is, if the depth at which the instrument is positioned is sufficiently great), the errors due to the zero shift and those due to the temperature sensitivity may be large enough to mask out the pressure changes caused by tidal fluctuations. These error sources in conventional measuring instruments thus place an upper limit on the depth at which conventional pressure sensing devices may be utilized to measure tidal flunctuations.

I have found that the depth at which accurate pressure measurements may be made can be extended by providing an internal reference pressure for the pressure sensing device and by operating it in the differential mode in which the difference between the external water pressure and the internal reference pressure is measured. This allows the use of a pressure sensing device having a shorter full scale range and thus having a smaller overall error due to zero shift and temperature sensitivity. I have also developed a means of adjusting the internal reference pressure to equal the external water pressure at a given point in time, thereby allowing the utilization of a pressure sensing device whose output reading is a direct indication of the tidal flunctuations.

In accordance with my invention, I provide a deep water tide recorder comprising an instrument casing for housing a pressure sensing device and a pressure source connected to the casing, the pressure source being adjustable to pressurize the casing automatically to the pressure of the environment in which the casing is immersed in order to establish a reference pressure in the casing. Also housed within the casing is a temperature measuring device and a driven recording medium for recording the temperature and pressure readings at selected time intervals; control mechanism for isolating the pressure source from the casing when the reference pressure has been established is also provided.

Accordingly, it is an object of my invention to provide an improved pressure measuring and recording instrument. Further, it is an object of my invention to provide an improved pressure measuring and recording instrument which is capable of operating with improved accuracy at relatively great depths. Another object of my invention is to provide an improved pressure measuring and recording instrument which utilizes an adjustable internal reference pressure to operate in the differential sensor mode. Yet another object of my invention is to provide an improved pressure measuring and recording instrument having control means to provide, automatically, an internal reference pressure that is equal to the external pressure of the environment in which the instrument is immersed.

It is one feature of my invention that the internal reference pressure is brought to a fixed value only after thermal equilibrium between the instrument and its environment has been established.

It is another feature of my invention that the utilization of an internal reference pressure allows the use of a relatively light-weight instrument casing at extended depths.

The above and other and further objects and features of my invention will become more readily apparent when considered in connection with the following detailed description of the drawings in which.

Figure 1:
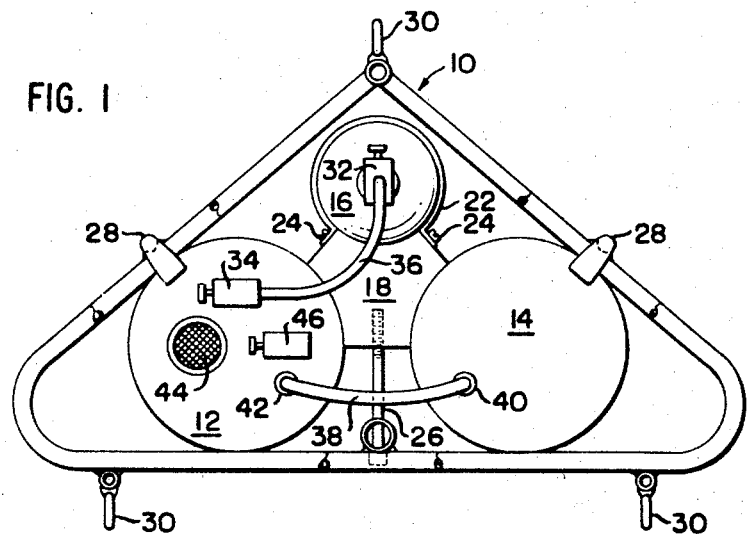
FIG. 1 is a front elevational view of a preferred embodiment of a deep water tide recorder constructed in accordance with my invention.
Figure 2:
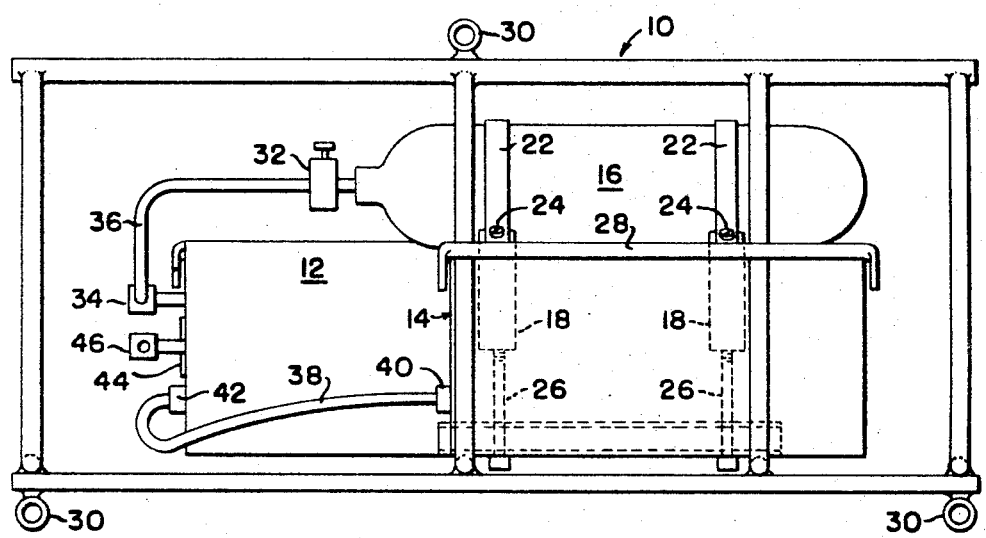
FIG. 2 is a side elevational view of the recorder of FIG. 1.

In FIGS. 1 and 2 of the drawing, there is shown a triangular frame 10 on which is mounted an instrument casing 12, a control unit casing 14, and a pressure source 16; the casings 12 and 14 are fluid-tight. The frame 10 may advantageously be formed of galvanized pipe while the casing 12 and 14 may advantageously be formed from a tough, corrosion-resistant polyvinyl chloride material. The pressure source 16 is preferably a conventional scuba diving bottle containing pressurized air at a pressure of 2100 p.s.i.g., although other pressure sources may be used. Interposed between the casings 12 and 14 and the pressure source 16 are a pair of triangular saddles 18 on which the pressure source 16 rests and to which it is rigidly attached by means of bands 22 and bolts 24. The saddles 18 are rigidly attached to the frame 10 by means of bolts 26, while the casings 12 and 14 are secured against longitudinal movement in the frame by means of clamps 28 which are welded to side bars of the frame. Eye bolts 30 are secured to the frame to allow the frame to be raised and lowered and to allow the attachment of weights to the frame to secure it in position on the ocean floor.

Compressed air is supplied from the pressure source 16 to the instrument casing 12 by means of regulator valves 32 and 34 and air supply line 36. The valve 32 may advantageously be a conventional first stage scuba-type regulating valve which will reduce the pressure of 2100 p.s.i.g. at its inlet side to a pressure of approximately 200 p.s.i.g. at its outlet side. The valve 34 is preferably a conventional second stage scuba-type regulating valve containing a diaphragm or other device for sensing the ambient hydrostatic pressure and balancing it against the pressure on the outlet side of the valve which, in this case, is the pressure of the instrument casing. This valve is preferably a two-way valve so that the internal reference pressure of the casing may be adjusted to equal the external ambient hydrostatic pressure within predetermined limits. In operation, a pressure difference of as little as 0.25 p.s.i.g. between the hydrostatic pressure and the internal reference pressure may be maintained. A further description of valves of this type may be obtained from Parker, A Complete Handbook of Skin Diving, Avon Books, New York, 1965 at pages 163 to 173.

An electrical harness 38 interconnects the instrument casing 12 and the control unit casing 14; the harness is fitted through the end walls of the casings 12 and 14 by means of water-proof electrical connectors 40 and 42 respectively. A pressure sensing device 44 and a pressure release valve 46 are located on one end face of the casing 12. The valve 46 vents the internal pressure in the casing 12 when the tide recorder is again brought to the surface after being submerged in the water body and, for this purpose, may be adjusted to operate when the internal pressure exceeds the external pressure by any convenient amount such as, for example, by 10 p.s.i.g. The valve 46 may also be utilized to adjust the internal reference pressure to the external hydrostatic pressure under certain conditions as will be described in more detail below; in this case the valve will be selected to operate when a smaller pressure drop exists across it. The pressure sensing device 44 will also be described in more detail below.

Figure 3:
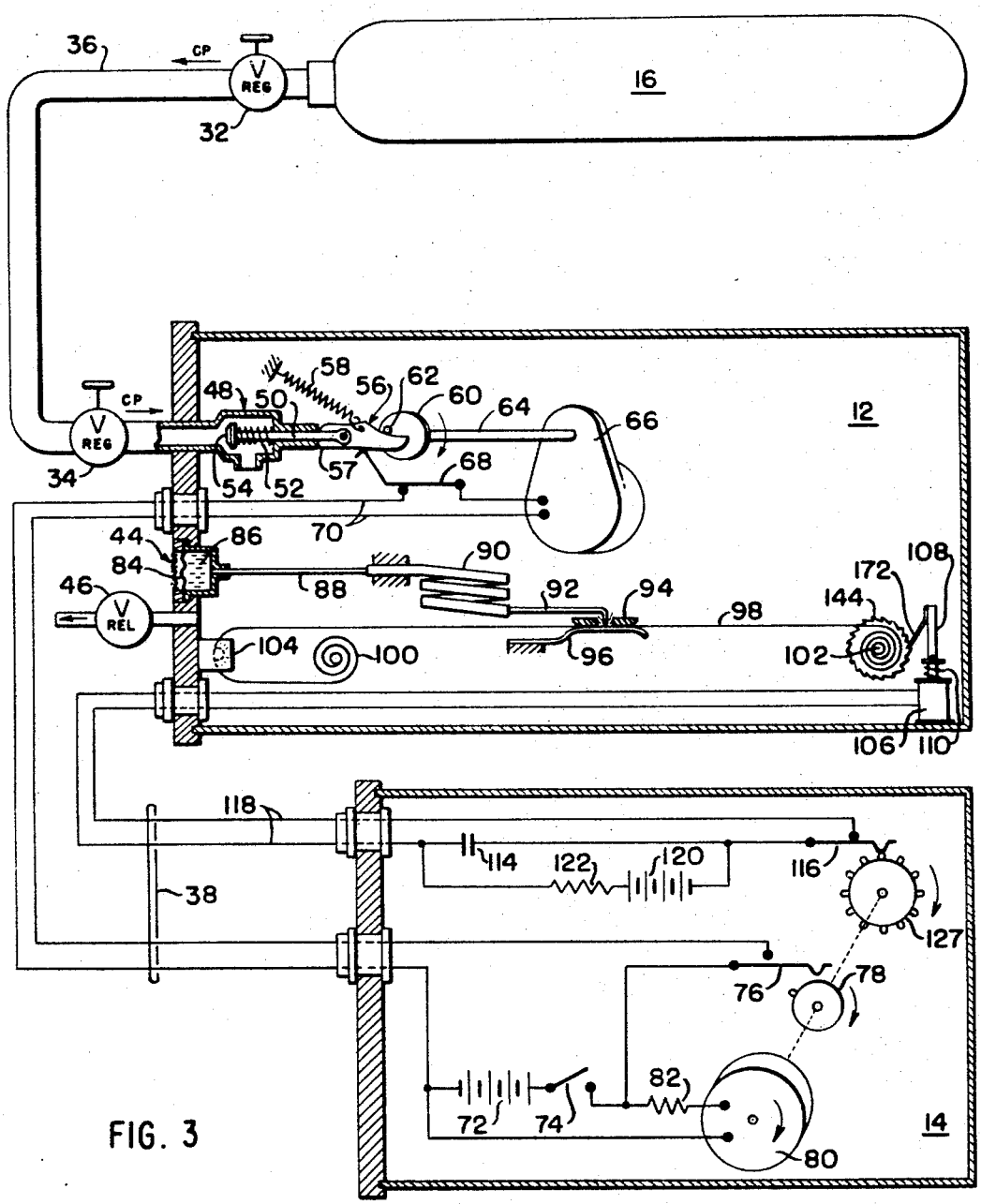
FIG. 3 is a schematic diagram of the tide recorder of FIGS. 1 and 2 showing the pressure and temperature sensing devices and the control mechanism for establishing an internal reference pressure.

FIG. 3 is a schematic diagram of the tide recorder of FIGS. 1 and 2 showing the pressure and temperature sensing devices and the control mechanisms in greater detail. For ease of illustration, the electrical harness 38 has been shown in two segments although it will be understood that a single harness as shown in FIGS. 1 and 2 may be used. Mounted on the outlet side of the regulator valve 34 is a toggle valve 48 comprising a valve stem 50 and a spring 52. One end of the valve stem carries a seat 54 for cutting off the air supply when the valve is moved forwardly toward the regulator valve 34 and the other end of the stem is pivotally attached to a toggle lever 56 having a cam-like rear surface 57 which butts against the rear face of the valve 48 to hold the valve in the open position when the toggle lever is horizontal. Associated with the lever 56 is a spring 58 and a cam 60 having a pin 62 against which the lever 56 is urged by the spring 58. The cam 60 is attached to a shaft 64 of a gear head motor 66 which is energized through a spring loaded switch 68 by means of electrical leads 70. The arm of the switch 68 bears against the toggle lever 56 and maintains the switch in closed position while the toggle lever is in the horizontal position.

Electrical power is supplied through the switch 68 to the motor 66 from a battery 72 via leads 70 and switches 74 and 76, all of which are located in the control unit casing 14. The switch 74 is a manually operated single pole, single throw switch while the switch 76 is a spring loaded, single pole switch which is closed by means of a cam 78 which is driven by a clock 80. The clock 80 is energized from the battery 72 through a dropping resistor 82, and is preferably adjusted to provide a rotation of 30° per hour as in conventional clocks.

The pressure sensing device 44, which is located on an end face of the instrument casing 12, comprises a pressure isolator which includes a diaphragm 84 and an oil filled reservoir 86 to which is connected a tube 88 which leads to a helical hollow tubular member 90 having an output indicating member in the form of a pointer 92 attached to its far end. The helical member 90 and the pointer 92 form a conventional Bourdon-type pressure indicator. The tip of the pointer has a coating of a phosphorescent material such as zinc sulfide with a radioactive exciter coated thereon to serve as an active light emitting source. This tip rides in the lateral slot of a bearing plate 94 which is positioned directly above a pressure plate 96. The plates 94 and 96 serve as guides for a layer of film 98 which is passed from a supply spool 100 to a take-up spool 102 under control of a stepping motor diagrammatically illustrated as comprising a solenoid 106, a shaft 108, a spring 110, and a pawl 112 which drives a ratchet 114 connected to the take-up spool 102. The film 98 is also passed over a mercury thermometer 104 (shown in end view in FIG. 3) having a coating of a phosphorescent material with a radioactive exciter adjacent its rear surface which serves as a light source for recording the image of the thermometer on the film. The film 98 is preferably an unperforated 70 mm. film of the type used for X-ray purposes. The film transport system together with the temperature recording system, is shown in more detail in U.S. Pat. No. 3,183,717 issued May 18, 1965 to E. C. Brainard, II and which is assigned to the present assignee. For the purposes of the present invention, it is sufficient to know that the film transport system may be adjusted to operate over a wide range, as for example, 1 step/10 minutes to 1 step/day and that the temperature and pressure sensing devices will provide an adequate record of the temperature and pressure during these intervals.

The solenoid 106 is actuated from a capacitor 114 in the control unit casing 14 via a single pole, spring loaded switch 116 and leads 118. The capacitor 114 in turn is energized from a battery 120 and a resistor 122 which limits the charging rate of the capacitor, while the switch 116 is actuated by means of a cam 124 which is driven from the clock 80. The battery 120 may be of the order of 135 volts for driving the solenoid 106; the capcitor 114 and the resistor 122 may be of the order of 300 microfarads and $10^5$ ohms respectively. The cam 124 may advantageously be geared to the clock 80 to provide a rotation of one revolution per hour while the cam 78 may be geared to the clock to provide a rotation of 30° per hour or one revolution per 12 hours. Other gearing ratios may, of course, be selected as desired.

The theory and operation of the invention may now be described in detail. The instrument casing 12, which is fluid-tight, serves as a constant-volume source of reference pressure for the pressure sensing device 44 which is responsive to the difference between the external hydrostatic pressure and the internal reference pressure of the instrument casing. In order to limit the range of the temperature sensing device 44 as nearly as possible to the pressure deviations of the external hydrostatic pressure at a given depth, the pressure source 16 is connected to the instrument casing 12 to supply pressurized air to the casing when the external hydrostatic pressure differs from the internal reference pressure as long as the valve 48 is open. After the valve 48 is closed, the internal reference pressure assumes a fixed value dependent only upon the temperature variations of the pressurized air within the casing in accordance with the well known gas laws.

The component of the recorded pressure which is due to these temperature variations may readily be ascertained by reference to the recorded temperature measurements generated by the temperature sensing device 104.

In preparing the deep water tide recorder of my invention for operation, the cam 78 is first manually turned in a counter-clockwise direction to provide a time delay between the energization of the clock 80 and the closing of the switch 76. Since the clock 80 will rotate the cam at a rate of 30° per hour in a clockwise direction, a time delay of one hour will be provided for every 30° that the cam 78 is manually turned in a counterclockwise direction from the switch 76. After setting the cam 78, the switch 74 is manually closed to energize the clock 80, thereby initiating the time interval. The instrument is then lowered into the water body whose tidal fluctuations are to be measured.

As the instrument casing 12 is lowered, the pressure source 16 supplies an increasing amount of pressurized air to the interior of the casing, and continues to do so until the casing is brought to the fixed depth at which pressure measurements are to be made. During this period, the capacitor 114 charges from the battery 120 via the resistor 122 and periodically discharges through the solenoid 106 and the switch 116 as the cam 127 intermittently closes the switch 116. Discharge of the capacitor through the solenoid 106 operates the stepping motor to advance the film 98 a predetermined amount at each step; the film advance mechanism is operative as long as the switch 74 remains closed, that is, as long as the instrument is maintained in its environment.

During the interval before the switch 76 is closed, the temperature of the pressurized air within the instrument 12 may be changing as the casing adjusts itself to the temperature of its environment. The valve 48 is thus maintained in the opened condition during this interval in order to allow the supply of additional pressurized air to compensate for any decrease in internal reference pressure caused by a decrease in the temperature of the pressurized air within the casing as the casing adjusts itself to the temperature of its environment. Of course, if the temperature of the surrounding water is initially greater than the temperature of the instrument casing, the internal reference pressure will increase as the temperature of the casing increases to the temperature of the surrounding environment. In this situation, the relief valve 46 will vent any excess pressure within the casing 12 if the operating range of the valve 46 is properly adjusted. This situation will be relatively uncommon, however, and the valve 46 may be set merely to vent the internal reference pressure as the instrument casing 12 is again being raised to the surface.

After a predetermined time interval, which is adjudged to be sufficient to bring the casing 12 to the temperature of its environment and which is determined by the setting of the cam 78, the cam 78 closes the switch 76 and thus connects the battery 72 in series with the switch 68 and the motor 66. As the motor 66 is energized, it drives the cam 60 in a clockwise direction, thus moving the pin 62 beyond the edge of the toggle lever 56. When the pin 62 clears the lever 56, the spring 58 pulls the lever upwardly and the valve stem 50 and seat 54 is moved into the valve 48, thus closing off the supply of pressurized air from the source 16. As the lever 56 is raised upwardly by the spring 58, the switch 68 opens and de-energizes the motor 66 to conserve the power supply 72. From this point on, the internal reference pressure becomes fixed except for pressure variations caused by temperature changes.

It will be noted that the pressure indicating pointer 92 and the thermometer 104 are located a fixed distance apart. Thus, to each pressure reading at a given location on the film 98 there corresponds a temperature reading at a different portion of the track. Thus, from knowledge of the separation between the pressure and temperature sensing components, the pressure and temperature of various points along the film track may be correlated with each other.

The tidal fluctuations in the vicinity of the tide recorder may now be determined directly from the record on the film 98. Since the internal reference pressure has been adjusted to equal the external hydrostatic pressure at a fixed depth and at a given point in time, the tide recorder will form a record of the hydrostatic pressure variations from the reference level caused by changes in depth due to tidal fluctuations. The component of the recorded pressure variations due to changes in the reference pressure caused by temperature changes may readily be determined from the temperature record and from a knowledge of the depth at which the tide recorder was operated.

Thus, if the reference pressure is stabilized at a depth $d_1$ and a temperature $T_1$, the reference pressure is given by:

(1) $$P_{r_1} = (n_1 R/V) T_1$$

The hydrostatic pressure at this depth is very nearly independent of the temperature and is given by:

(2) $$P_{h_1} = \beta d_1$$

where $\beta$ is approximately a constant. Within the limits of regulation of the valves 34 and 46:

(3) $$P_{r_1} = (n_1 R/V) T_1 = P_{h_1} = \beta d_1$$

and (4) $$(n_1 R/V) = \beta d_1 / T_1 = \text{constant}$$

Then, at any depth $d$ and temperature $T$, the measured pressure difference is given by:

(5) $$\begin{aligned} Pm = P_h - P_r &= \beta(d - d_1 + d_1) - (n_1 R/V)(T - T_1 + T_1) \\ &= \beta(d_1 + \Delta d) - (n_1 R/V)(T_1 + \Delta T) \\ &= \beta \Delta d - (n_1 R/V) \Delta T \end{aligned}$$

where $\Delta d = d - D_1$ and $\Delta T = T - T_1$. Since $(n_1 R/V)$ is a fixed quantity which may be determined from Equation 4, the temperature-dependent component of the pressure is readily determined from Equation 5 and may thus be corrected for. Additional pressure variations cause by changing barometric conditions may be determined by independently-maintained records of these conditions or may be separated from the recorded data by means of statistical techniques when tidal fluctuations are measured over a relatively long period.

Since the pressure range of the tide recorder of my invention need only be adequate to cover the expected tidal fluctuation range together with the pressure variations due to temperature changes and changes in barometric conditions, the range of the pressure sensing device is reduced considerably in comparison to conventional tide recording systems in which the pressure range was required to be sufficient to respond to the pressure at the depth at which the instrument was located together with pressure variations caused by tidal fluctuations, changing temperatures, and changing barometric conditions. Thus, the errors which are due to changes in the zero position of the pressure sensing device and which are dependent upon the the full scale range of the device are inherently lower in the pressure sensing device of my invention, which is operated in the differential mode, than in conventional instruments.

In some cases it may be desirable to use a simplified form of pressure regulation. Thus, the valve 36 may be omitted and the valve 34 replaced by a simple needle-type bleed valve having a small orifice through which air passes at very high speed, the dimensions of the valve orifice being such that the amount of the air which passes through the valve reaches an upper limit at the speed of sound. In this case, the remaining components of the system are the same as shown in FIG. 3 but the valve 46 is adjusted to vent the excess pressure in the casing 12 when this pressure exceeds the hydrostatic pressure by only a small amount. In this system, pressurized air is supplied from the source 16 to the casing via the needle-type bleed valve as long as the valve 48 is open, and the valve 46 continuously vents any excess pressure. When the valve 48 is subsequently closed via the switch 76 and the motor 66, the air supply is cut off and the volume of air within the casing 12 is again fixed. A pressure and temperature record is then formed as previously.

It will thus be seen that I have provided an improved pressure measuring and recording instrument which is capable of operating with improved accuracy at relatively great depths. It will also be seen that I have provided an improved pressure measuring and recording instrument which utilizes an automatically adjusted internal reference pressure to operate in the differential sensor mode and which contains control mechanism to allow the adjustment of the internal reference pressure to the external hydrostatic pressure at a given depth and at a given point in time.

Having described and illustrated a preferred embodiment of my invention, I claim:

1. An instrument for measuring the pressure of an environment in which said instrument is immersed, comprising, in combination, a pressure source for generating a fluid pressure independently of said environment, means regulating said source to establish a reference pressure, a pressure indicator capable of responding to the difference in pressure between said environment and said reference pressure, means communicating said environmental pressure and said reference pressure established by said regulating means to said pressure indicator, and means for recording the output indication of said indicator whereby the pressure difference between the environmental pressure and the reference pressure may be recorded.

2. The combination defined in claim 1 in which said regulating means includes means for setting said reference pressure to a fixed pressure whereby subsequent deviations of the environmental pressure from said fixed pressure may be recorded.

3. The combination defined in claim 2 in which said regulating means includes means for fixing said reference pressure at a pressure substantially equal to the environmental pressure of said instrument at a given time whereby subsequent deviations from said environmental pressure may be recorded.

4. The combination defined in claim 3 in which said regulating means includes a valve interconnecting said pressure source and said indicator, a clock, and means interconnecting said clock and said valve whereby said valve may be closed after a predetermined time interval to isolate said source from said indicator.

5. The combination defined in claim 4 in which said instrument includes a thermometer associated with said recording means whereby the temperature dependence of said reference pressure may be recorded for measuring the temperature dependence of said reference pressure, said recording means including means for recording the reading of said thermometer.

6. The combination defined in claim 5 in which said means interconnecting said clock and said valve includes a cam driven by said clock, a first electrical switch actuated by said cam, a power supply in series with said switch, an electrical motor in series with said power supply and operable thereby on closure of said switch, and cam means driven by said motor for closing said valve when said motor is actuated.

7. The combination defined in claim 5 in which said instrument contains relief valve means for venting the reference pressure when said pressure exceeds the environmental pressure by a predetermined amount.

8. A deep water tide recorder, comprising a water tight container adapted to be anchored in a body of water at a predetermined depth, a source of fluid under a pressure greater than the maximum hydrostatic pressure at said predetermined depth, a conduit connecting said source to said container, regulating means operable when actuated to adjust the fluid pressure in said container to an external ambient pressure approximately equal to said maximum pressure, valve means operable to close said conduit to establish a reference volume of fluid in said container, a pressure transducer mounted in said container for producing a signal in accordance with the pressure difference between the inside and outside of the container, a temperature transducer mounted in said container for producing a signal in accordance with the temperature in said container, a signal recorder connected to said transducers for storing the signals produced thereby, and timing means operable when actuated for operating said valve means with an intermediate delay sufficient to permit said regulating means to bring the pressure in said container substantially to the ambient hydrostatic pressure before said conduit is closed when said timing means is actuated and said container is anchored in a body of water.

References Cited

UNITED STATES PATENTS

| 2,592,159 | 4/1952 | Klebba et al. | 73—391 X |
| 2,955,467 | 10/1960 | Parkhurst | 73—391 X |
| 3,216,260 | 11/1965 | Erdely. | |

JAMES J. GILL, *Primary Examiner.*

JERRY W. MYRACLE, *Assistant Examiner.*

U.S. Cl. X.R.

73—300